United States Patent [19]
Donohue

[11] 3,940,472
[45] Feb. 24, 1976

[54] QUATERNARY SULFIDES AND SELENIDES CONTAINING BA OR SR AND SELECTED TRANSITION METALS

[75] Inventor: Paul Christopher Donohue, Wilmington, Del.

[73] Assignee: E. I. Du Pont de Nemours and Company, Wilmington, Del.

[22] Filed: May 22, 1974

[21] Appl. No.: 472,424

[52] U.S. Cl. ............ 423/511; 423/508; 252/62.3 V; 252/519; 252/521
[51] Int. Cl.² C01B 19/00; C01B 17/00; C01F 11/00
[58] Field of Search........ 423/508, 511; 252/62.3 R, 252/62.3 V, 501, 518, 519, 521

[56] References Cited
UNITED STATES PATENTS

| | | | |
|---|---|---|---|
| 2,728,637 | 12/1955 | Alderson et al. | 423/511 |
| 2,770,527 | 11/1956 | Alderson et al. | 423/511 |
| 2,770,528 | 11/1956 | Maynard | 423/511 |
| 3,801,702 | 4/1974 | Donohue | 423/511 X |
| 3,851,045 | 11/1974 | Donohue | 423/511 X |

OTHER PUBLICATIONS
Schmidt, "Physics Letters" Vol. 31A, No. 10, 1970, pp. 551–552.
Hahn et al., "Z. Anog. Chem.," Vol. 288, p. 269 (1956).
Gardener et al., "Acta Cryst." Vol. B25, p. 781 (1969).

*Primary Examiner*—Jack Cooper

[57] ABSTRACT

Described herein are solid compositions of the formula $M M'_{1-y}M''_y X_3$ 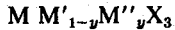

where
  M is Ba or Sr
  M' is one or more of Ta and Nb
  M'' is one or more of Cr, Mn, Fe, Co, Ni, Cu, Rh and Ir
  X is one or more of S and Se, and
  y is 0.33 to 0.5,
with the proviso that when M is Sr, the compound is of the formula
  $SrTa_{0.5}M''_{0.5}S_3$ 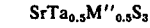

and M'' is one or more of Cr and Fe. These compositions are useful as semiconductors.

8 Claims, No Drawings

QUATERNARY SULFIDES AND SELENIDES CONTAINING BA OR SR AND SELECTED TRANSITION METALS

BACKGROUND OF THE INVENTION

1. Field of the Invention

This invention relates to quaternary sulfides and selenides containing barium or strontium and a mixture of transition metals containing a metal of Periodic Group V and a metal of Periodic Groups VI to VIII or Cu. These compounds are useful as semiconductors.

2. Description of the Prior Art

Ternary sulfides are known with the formula $MM'S_3$ wherein M is an alkaline earth metal of Periodic Group II and M' is a transition metal of Periodic Group IV; e.g., the compounds $SrTiS_3$, $BaTiS_3$ and $BaZrS_3$ are described by Hahn et al., *Z. Anorg. Chem.*, vol. 288, p. 269 (1956); and the compounds $BaTiS_3$, $BaZrS_3$ and $SrZrS_3$ are described by Clearfield in *Acta. Cryst.*, vol. 16, pp. 135–142 (1962). Analogous compounds have been reported with transition metals of Group V; e.g., $BaTaS_3$ is described by Aslanov et al. in *Russ. Jour. Inorg. Chem.*, vol. 9, p. 1317 (1964); and $BaVS_3$ and $BaTaS_3$ are described by Gardener et al. in *Acta. Cryst.*, vol. B25, p. 781 (1969), and in *Inorg. Chem.*, vol. 8, No. 12, pp. 2784–2787 (1969). Their formulation is consistent with the known ability of the Group V transition metals to form not only pentavalent but also tetravalent ions, particularly in combination with a reducing species such as sulfide ion.

Quaternary sulfides have also been reported in the form of solid solutions of ternary compounds of two different tetravalent metals; e.g., $BaTi_{1-x}V_xS_3$ described by Gardener, *Ph.D. Thesis*, Department of Chemistry, Brown University, Providence, R.I., 1969.

SUMMARY OF THE INVENTION

In accordance with this invention I have now discovered solid compositions of the formula $M M'_{1-y}M''_yX_3$ where
M is Ba or Sr,
M' is one or more of Ta and Nb,
M'' is one or more of Cr, Mn, Fe, Co, Ni, Cu, Rh and Ir,
X is one or more of S and Se, and
y is 0.33 to 0.5, with the proviso that, when M is Sr, the compound is of the formula
$SrTa_{0.5}M''_{0.5}S_3$
and M'' is one or more of Cr and Fe.

DETAILED DESCRIPTION OF THE INVENTION

The compositions of this invention are quaternary sulfides or selenides of barium or strontium. The barium compositions of this invention are of the formula $BaM'_{1-y}M''_yX_3$ wherein M' is one or more of Ta and Nb; M'' is one or more of Cr, Mn, Fe, Co, Ni, Cu, Rh and Ir; X is one or more of S and Se; and y is 0.33 to 0.5. These compositions are characterized by a BaNiO$_3$-type hexagonal crystal structure based on hexagonal closed-packed $BaX_3$ layers with transition metal cations in one quarter of the octahedral voids between the layers. The volume of the unit cell is determined primarily by the anion. For the sulfides the unit cell volume (2 molecules of $BaM'_{1-y}M_yS_3$) is approximately 230A$^3$, essentially the same as reported for $BaTiS_3$ and $BaTaS_3$. The X-ray patterns reported for the latter prior art compounds and a representative pattern for $BaTa_{0.5}Co_{0.5}S_3$ detailed in Table I can be used, along with the lattice parameters, to characterize the new compositions. The parameter, a, of the hexagonal unit cell generally contracts a small but definite amount as some of the tantalum or niobium of the ternary sulfides is replaced by another transition metal, M''. The length of the unit cell frequently increases slightly so that the effect on cell volume is minor. The same effect is observed for the selenides, which understandably have larger unit cell volumes of about 260A$^3$.

In the Ba compounds, when M'' is Cu, an orthorhombic distortion of this structure prevails. This distortion results in an orthorhombic unit cell approximately doubled in size, similar to that described for the low-temperature form of the prior art $BaVS_3$.

The strontium compositions of this invention are of the formula
$SrTa_{0.5}M''_{0.5}S_3$
where M'' is one or more of Cr and Fe. Since the size of the $Sr^{+2}$ ions (being smaller than $Ba^{+2}$) is inadequate for combination with the larger selenide ion, the strontium compounds are limited to sulfides. When M'' is Fe, the compound is of the BaNiO$_3$-type structure. It appears that strontium compounds with Cr may persist in both the hexagonal $LaAlS_3$ and BaNiO$_3$ forms. The strontium compounds of the BaNiO$_3$ structure type, $SrTa_{0.5}Fe_{0.5}S_3$ and $SrTa_{0.5}Cr_{0.5}S_3$, have unit cell volumes of 207A$^3$ and 195A$^3$, respectively. Compounds of the $LaAlS_3$ type have unit cells equivalent to about three cells of the BaNiO$_3$-type.

The prototype Ba compounds are $BaM_{1/2}^{+5}M_{1/2}^{+3}X_3$ and $BaM_{2/3}^{+5}M_{1/3}^{+2}X_3$ where $M^{+5}$ is either Ta or Nb, and X is either S or Se. These stoichiometries result from the fact that the transition elements, M'', generally form divalent and trivalent ions. From this known tendency it will be understood that a small proportion of altervalent ions may be present without change in the structure or essential character of the compositions.

Thus, in $BaTa_{1/2}^{+5}M_{1/2}^{+3}S_3$ a small proportion of the M metal may be present as a divalent ion and the stoichiometry compensated by an equivalent deficiency in sulfur. A deficiency of up to about 10 percent in the sulfur content is possible without change in the structure, and such latitude is considered to be within the scope of the invention.

Similarly, in $BaTa_{2/3}^{+5}M_{1/3}^{+2}S_3$ a small proportion of the M metal may be present in the trivalent state and the stoichiometry compensated by an equivalent deficiency in the total number of occupied cation sites. The structural features of these compositions indicate that a full complement of divalent barium ions is required, but that some transition metal cations occupying the interstices between $BaX_3$ layers may be absent without a significant change in structure. A deficiency of up to about 10 percent of the transition metal cations is considered to be within the scope of the invention (e.g. $BaTa_{0.60}Rh_{0.33}S_3$).

It will be apparent that for certain of the M'' elements particular oxidation states will be especially favorable. Thus, since Cu lacks a stable trivalent oxidation state, the compound of precise stoichiometry $BaTa_{1/2}Cu_{1/2}S_3$ gives way to the stable species $BaTa_{1/2}Cu_{1/2}S_{2.75}$ wherein the slight sulfur deficiency permits divalent copper ions to occupy cation sites in the prototype $BaTa_{1/2}^{+5}M_{1/2}^{+3}S_3$ formulation. Similarly, an element such as iron having divalent and trivalent ions of comparable stability may exhibit both valences simultaneously as in $BaTa_{0.6}Fe_{.2}^{+2}Fe_{.2}^{+3}S_3$ and $BaTa_{0.5}Fe_{.25}^{+2}Fe_{.25}^{+3}S_{2.875}$.

Even though the stoichiometries do not necessarily establish the valence of each element in these new quaternary chalcogenides, they do suggest that Ta and Nb are appropriately viewed as pentavalent in all these compounds. Accordingly, they call to question the nature of Ta in the prior art $BaTaS_3$ of identical crystalline structure but formally thought to be tetravalent. Further investigation of this known compound in the light of the quaternary compositions of this invention indicate that the proper formulation is $BaTa_{0.80}S_3$ wherein Ta is formally pentavalent and apparently occupies only 1/5 instead of ¼ of the available octahedral sites between the hexagonal close-packed $BaS_3$ layers.

The compositions of this invention are stable crystalline solids which can be prepared by direct combination from the elements or from precursor compounds which provide the elements in the appropriate proportions. Combining of the elements generally occurs by solid state diffusion, and times and temperatures appropriate to such reactions are needed. In general, temperatures in the range of about 500°–1100°C. are used for times ranging from about four hours to 4 days or more, preferably in several stages with intermediate grinding to promote intimate contact between reactants. Air and water vapor should be expelled from the reaction environment to prevent oxidation or hydrolysis of the chalcogenides at the elevated temperature.

The reaction may be carried out within a closed vessel such as a silica tube using the appropriate quantities of the elements. Under these conditions heating is carried out gradually to assure that high pressure of the gaseous chalcogen is not built up before it can be assimilated by solid state diffusion processes. Thereafter the temperature is preferably raised to 800°–1100°C to speed up diffusion. During the early stages of reaction a thermal gradient along the reaction tube is useful to prevent excess pressure. Reactivity is promoted by using finely powdered mixtures of Ta or Nb, M'' elements, and S or Se, as well as by the addition of a few crystals of iodine. Ba or Sr should be cut and weighed in an inert atmosphere such as a nitrogen-filled dry box. Any tendency for reactivity with a silica vessel can be reduced by first applying a protective coating of carbon to the inner walls e.g., by pyrolysis of toluene.

Alternatively the source of metallic elements may be a mixture of oxides or carbonates over which is caused to flow a gaseous source of the chalcogen such as $CS_2$, $H_2S$, $H_2Se$ or $CSe_2$. Other modifications will be readily apparent such as the direct combination with performed sulfides of certain of the metals.

The products are usually obtained as a mass of black sintered material. Under particular conditions some of these quaternary chalcogenides may be obtainable as single crystals by utilizing generally recognized flux-, vapor-, or melt-growth techniques.

The products may be characterized by their X-ray diffraction patterns as well as by chemical analysis. Using these preparative methods completeness of reaction may be judged by the attainment of a single phase X-ray diffraction pattern of the character detailed in the examples.

All the compositions of this invention are semiconductors. Depending upon the activation energy for conduction in each particular case they are useful as thermistors, infrared detectors, thermoelectrics, diodes, etc.

The compositions may be used as temperature sensors by measuring resistivity, $\rho$, since the trend of log $\rho$ is linear with the reciprocal of absolute temperature. The slope for particular cases is indicated by the values of the activation energy, Ea, cited in the examples below.

Utility for detection of infrared radiation was demonstrated by measuring the resistance (using a Kiethley 610C ohm meter) of compressed pellets of these compositions in the dark as well as during exposure to an infrared source (Nicols microscope lamp and Corning No. 2540IR filter — 85% transmittance in the range 1.25–2.5 $\mu$m). The change of resistance in ohms is noted below.

| Sample of Example No. | Dark resistance | Light resistance | Ratio Dark/Light |
|---|---|---|---|
| 1 | $2.3 \times 10^5$ | $2.1 \times 10^5$ | 1.1 |
| 25 | $1 \times 10^7$ | $6 \times 10^6$ | 1.66 |
| 27 | $5 \times 10^{10}$ | $3 \times 10^{10}$ | 1.66 |

The disclosure above will enable one skilled in the art to prepare and use novel compositions beyond those particularly described in the examples below. It will be apparent that solid solutions may be expected between species having common structure type and similar size ions, e.g. between Ta and Nb compositions, S and Se compositions and various M'' combinations. Because of the disparity in size, structure-type or both, only limited solid solution is to be expected between Ba and Sr compositions.

EXAMPLES OF THE INVENTION

The following examples, illustrating the novel compositions of this invention, are given without any intention that the invention be limited thereto. All percentages are by weight. All temperatures are in degrees Centigrade.

EXAMPLE 1

$BaTa_{0.5}Co_{0.5}S_3$

A mixture containing 0.3966 g of Ba, 0.2613 g of Ta, 0.0851 g of Co, and 0.2778 g of S in the gram atom proportions of Ba/0.5Ta/0.5Co/3S was sealed with 0.05 g of $I_2$ in an evacuated silica tube coated on the inside by carbon from the pyrolysis of toluene. The tube was heated in a gradient, 500° in the hot zone and 400° in the cooler zone, for two days. It was cooled, opened, reground, resealed in an evacuated silica tube, and reheated at 850° for two days. The tube contained a black homogeneous looking product which exhibited an X-ray powder diffraction pattern of the $BaNiO_3$ type. The product was reground, resealed, and reheated at 900° for two days. All lines of the X-ray powder pattern of the product could be indexed by a single $BaNiO_3$-type pattern indicative of a single phase product.

Table I

X-Ray Powder Diffraction Pattern of $BaTa_{0.5}Co_{0.5}S_3$

| I | H | K | L | D observed | D calculated |
|---|---|---|---|---|---|
| 60 | 1 | 0 | 0 | 5.8710 | 5.8478 |
| 50 | 1 | 0 | 1 | 4.0851 | 4.0864 |
| 95 | 1 | 1 | 0 | 3.3772 | 3.3762 |
| 20 | 0 | 0 | 2 | 2.8510 | 2.8564 |
| 60 | 2 | 0 | 1 | 2.6021 | 2.6028 |
| 40 | 1 | 0 | 2 | 2.5704 | 2.5666 |
| 10 | 2 | 1 | 0 | 2.2061 | 2.2103 |
| 30 | 2 | 0 | 2 | 2.0422 | 2.0432 |
| 40 | 3 | 0 | 0 | 1.9491 | 1.9493 |
| 10 | 1 | 0 | 3 | 1.8090 | 1.8107 |
| 20 | 2 | 1 | 2 | 1.7467 | 1.7480 |
| 60 | 2 | 2 | 0 | 1.6873 | 1.6881 |
| 2 | 2 | 2 | 1 | 1.6184 | 1.6189 |
|  | 3 | 1 | 0 |  | 1.6219 |
|  | 3 | 0 | 2 |  | 1.6101 |
| 5 | 2 | 0 | 3 | 1.5974 | 1.5956 |
| 5 | 3 | 1 | 1 | 1.5620 | 1.5602 |
| 5 | 3 | 1 | 2 | 1.4115 | 1.4104 |
|  | 4 | 0 | 1 |  | 1.4163 |
| 5 | 3 | 2 | 1 | 1.3041 | 1.3060 |
|  | 4 | 0 | 2 |  | 1.3014 |
| 10 | 4 | 1 | 0 | 1.2758 | 1.2761 |
| 5 | 3 | 2 | 2 | 1.2170 | 1.2143 |
| 2 | 6 | 0 | 0 | 0.9762 | 0.9746 |
|  | 3 | 2 | 4 |  | 0.9778 |

EXAMPLES 2-21

These examples were carried out in the manner described in Example 1. The reactants and results are given in Table II.

TABLE II

| Example | Reactant Ratio | Product Characterization |
|---|---|---|
| 2 | Ba/0.5Ta/0.5Cr/3S | Single phase $BaNiO_3$ type, a = 6.7641 A, c = 5.8019 A, Semiconductor: $\rho 298K$ = $3 \times 10^3$ ohm-cm, Ea = 0.2 eV. |
| 3 | Ba/0.5Nb/0.5Co/3S | Single phase $BaNiO_3$ type, a = 6.764 A, c = 5.723 A. Found by atomic absorption analysis: 41.44% Ba, 14.59% Nb, 10.92% Co. Calc.: 44.38% Ba, 15.01% Nb, 9.52% Co. Found: 29.85% S. Calc. 31.08% S. |
| 4 | Ba/0.5Ta/0.5Mn/3S | $BaNiO_3$-type pattern plus unidentified lines in the pattern, a = 6.90 A, c = 6.03 A |
| 5 | Ba/0.5Ta/0.5Ni/3S | Single phase $BaNiO_3$ type, a = 6.781 A, c = 5.763 A |
| 6 | Ba/0.667Ta/0.33Co/3S | Single phase $BaNiO_3$ type, a = 6.784 A, c = 5.753 A |
| 7 | Ba/0.667Ta/0.33Fe/3S | Single phase $BaNiO_3$ type, a = 6.810 A, c = 5.8096 A |
| 8 | Ba/0.5Ta/0.5Rh/3S | Single phase $BaNiO_3$ type, a = 6.733 A, c = 5.896 A, Semiconductor $\rho 298K$ = $10^8$ ohm-cm, Ea = 0.6 eV |
| 9 | Ba/0.5Nb/0.5Fe/3S | Single phase $BaNiO_3$ type, a = 6.817 A, c = 5.753 A |
| 10 | Ba/0.667Nb/0.33Mn/3S | Single phase $BaNiO_3$ type, a = 6.828 A, c = 5.86 A |
| 11 | Ba/0.667Ta/0.33Mn/3S | a = 6.816 A, c = 5.91 A, some unindexed lines |
| 12 | Ba/0.667Ta/0.33Cr/3S | Single phase $BaNiO_3$ type, a = 6.796 A, c = 5.804 A |
| 13 | Ba/0.5Ta/0.5Cr/2.5S | Single phase $BaNiO_3$ type, a = 6.794 A, c = 5.697 A, Compared to a = 6.76A, c = 5.81 A for $BaTa_{0.5}Cr_{0.5}S_3$ indicates S nonstoichiometry is possible |
| 14 | Ba/0.5Ta/0.5Ir/3S | Nearly single phase, $BaNiO_3$ type, a = 6.732 A, c = 5.889 A, some very weak unindexed lines |
| 15 | Ba/0.5Ta/0.5Ir/3Se | Single phase $BaNiO_3$ type, a = 7.018 A, c = 6.109 A, Semiconductor $\rho 298K$ = $1 \times 10^5$ ohm-cm |
| 16 | Ba/0.5Ta/0.5Fe/3Se | Nearly single phase, $BaNiO_3$ type, a = 7.108 A, c = 6.014 A |
| 17 | Ba/0.5Ta/0.5Cr/3Se | Nearly single phase $BaNiO_3$ type, a = 7.10 A, c = 6.032 A, some weak extra lines present |
| 18 | Ba/0.5Ta/0.5Co/3Se | Nearly single phase, $BaNiO_3$ type, a = 7.06 A, c = 5.95 A, some extra weak lines |
| 19 | Sr/0.5Ta/0.5Cr/3S | Heated at 1000°C powder pattern was like $BaNiO_3$, a = 6.63 A, c = 5.12 A, Reheating at 800° produced the $LaAlS_3$-type pattern |

EXAMPLE 20

$BaNb_{0.5}Cr_{0.5}S_3$

A mixture containing 0.9264 g of Ba, 0.3133 g of Nb, 0.1753 g of Cr, and 0.6488 g of S in the gram atom proportions of Ba/0.5Nb/0.5Cr/3S was sealed with 0.05 g of $I_2$ in an evacuated silica tube previously coated on the inside with carbon from the pyrolysis of toluene. The tube was heated in a gradient of 600° to 300° for 2 days. It was cooled, shaken to better mix the reagents, and reheated at 800° to 500° for two days. It was again shaken and reheated at 900° to 600° for two days. Then the entire tube was heated at 700° for three days. It was opened, reground, resealed in silica and heated at 800° for three days. The X-ray powder pattern of the product showed a single phase $BaNiO_3$-type pattern with refined cell parameters, a = 6.7663 ± 0.0009 A and c = 5.779 ± 0.001 A.

EXAMPLE 21

$BaTa_{0.5}Fe_{0.5}S_3$

A mixture containing 1.1350 g of $BaCO_3$, 0.6354 g of $Ta_2O_5$ and 0.2296 g of $Fe_2O_3$ in the ratio of 1 Ba:0.5 Ta:0.5 Fe was ground in an agate mortar, placed in a silica boat, and heated at 700° for 8 hours in a steam of reagent grade $H_2S$. The product showed a nearly single phase $BaNiO_3$-type X-ray powder pattern indexable with the hexagonal cell dimensions: a = 6.812 A and c = 5.792 A. It was reground and heated in a stream of $H_2S$ at 900° for 24 hr. The product showed a single phase X-ray powder pattern with refined cell dimensions, a = 6.814 ± 0.001 A and c = 5.747 ± 0.001 A. Chemical analysis for S indicates an S deficiency. Found: 26.21% S. Calc. for $BaTa_{0.5}Fe_{0.5}S_3$: 27.33% S.

EXAMPLES 22–23

These Examples were carried out in the manner described in Example 23. The reactants and results are given in Table IV.

TABLE V

| Example | Reactant Ratio | Product Characterization |
|---|---|---|
| 22 | $2BaCO_3/_{0.5}Ta_2O_5/CuO$ + flowing $H_2S$ | Single phase, orthorhombic distortion of the $BaNiO_3$ structure, a = 12.21 A, b = 6.843 A, c = 5.843 A. Found: 25.46% S, Calcd. for $BaTa_{0.5}Cu_{0.5}S_{2.75}$: 25.35% S. |
| 23 | $2SrCO_3/0.5Ta_2O_5/FeO$ + flowing $H_2S$ | $BaNiO_3$ type: a = 6.673 A, c = 5.372 A. Found 32.46% S, Calcd. 31.83 S. Semiconductor $\rho 298K = 10^3$ ohm-cm, Ea = 0.4 eV |

EXAMPLE 24

$BaTa_{0.5}Cr_{0.5}S_3$

A mixture containing 1.1413 g of $BaCO_3$, 0.6389 g of $Ta_2O_5$, 0.2198 g of $Cr_2O_3$ in the ratio of 1 Ba:0.5 Ta:0.5 Cr was treated in the same way as the mixture of Example 21. The final product shows a single phase $BaNiO_3$-type pattern with refined dimensions, a = 6.7631 ± 0.0006 A and c = 5.814 ± 0.001 A. Chemical analysis for S indicated full S content. Found: 27.70% S. Calc. for $BaTa_{0.5}Cr_{0.5}S_3$: 27.48% S.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A semiconducting composition with a $BaNiO_3$-type hexagonal crystal structure of the formula $MM'_{1-y}M''_yX_3$ where
  M is Ba or Sr,
  M' is one or more of Ta and Nb,
  M'' is one or more of Cr, Mn, Fe, Co, Ni, Cu, Rh and Ir,
  X is one or more of S and Se, and
  y is 0.33 to 0.5,
with the proviso that, when M is Sr, the compound is of the formula $SrTa_{0.5}M''_{0.5}S_3$ and M'' is one or more of Cr and Fe.

2. The semiconducting composition of claim 1 of the formula $BaM'_{1-y}M''_yX_3$.

3. The semiconducting composition of claim 2 of the formula $BaTa_{1-y}M''_yS_3$.

4. The semiconducting composition of claim 3 of the formula $BaTa_{0.5}Co_{0.5}S_3$.

5. The semiconducting composition of claim 2 of the formula $BaNb_{1-y}M''_yS_3$.

6. The semiconducting composition of claim 1 of the formula
$SrTa_{0.5}M''_{0.5}S_3$.

7. The semiconducting composition of claim 6 in which M'' is Cr.

8. The semiconducting composition of claim 6 in which M'' is Fe.

* * * * *